(12) United States Patent
Cao et al.

(10) Patent No.: US 10,923,904 B2
(45) Date of Patent: Feb. 16, 2021

(54) OVERVOLTAGE PROTECTION UNIT, OVERVOLTAGE PROTECTION METHOD, SAMPLING MODULE, PIXEL CIRCUIT AND DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Chun Cao, Beijing (CN); Min He, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/604,863

(22) PCT Filed: Jan. 29, 2019

(86) PCT No.: PCT/CN2019/073685
§ 371 (c)(1),
(2) Date: Oct. 11, 2019

(87) PCT Pub. No.: WO2019/218727
PCT Pub. Date: Nov. 21, 2019

(65) Prior Publication Data
US 2020/0274347 A1 Aug. 27, 2020

(30) Foreign Application Priority Data
May 15, 2018 (CN) .......................... 2018 1 0461227

(51) Int. Cl.
*G09G 3/3266* (2016.01)
*H02H 3/20* (2006.01)
*H02H 1/00* (2006.01)

(52) U.S. Cl.
CPC ............. *H02H 3/20* (2013.01); *G09G 3/3266* (2013.01); *H02H 1/0007* (2013.01); *G09G 2330/04* (2013.01)

(58) Field of Classification Search
CPC ............... G09G 3/3258; G09G 3/3233; G09G 2300/043; G09G 3/3266; G09G 2330/04;
(Continued)

(56) References Cited

U.S. PATENT DOCUMENTS

| 2014/0347332 A1 | 11/2014 | Lee | |
| 2016/0125811 A1* | 5/2016 | Park | G09G 3/3258 345/694 |
| 2017/0025958 A1* | 1/2017 | Yu | G06F 1/266 |

FOREIGN PATENT DOCUMENTS

| CN | 201312298 Y | * 9/2009 |
| CN | 103227630 A | 7/2013 |

(Continued)

OTHER PUBLICATIONS

Analog Devices, Inc., "Design of High-Voltage Transients for Integrated Circuit Analog Inputs and Outputs," Mar. 28, 2018, 13 pages.
(Continued)

*Primary Examiner* — Robert J Michaud
(74) *Attorney, Agent, or Firm* — Muncy, Geissler, Olds and Lowe, P.C.

(57) ABSTRACT

An overvoltage protection unit, an overvoltage protection method, a sampling module, a pixel circuit and a display apparatus are provided. The overvoltage protection unit includes a comparator and an output switch, where a first input terminal of the comparator is supplied with a predetermined maximum voltage, a second input terminal of the comparator is supplied with an actual sampled voltage, an output terminal of the comparator is connected with a control terminal of the output switch and the actual sampled
(Continued)

voltage is supplied to an input terminal of the output switch; the output switch selectively outputs the actual sampled voltage in accordance with an output signal of the comparator.

12 Claims, 3 Drawing Sheets

(58) Field of Classification Search
CPC ............ G09G 2300/0828; H05B 45/37; H05B 47/185; H05B 45/00; H05B 47/175; H02H 3/20; H02H 1/0007
See application file for complete search history.

(56) References Cited

FOREIGN PATENT DOCUMENTS

| | | |
|---|---|---|
| CN | 105575332 A | 5/2016 |
| CN | 106782396 A | 5/2017 |
| CN | 108648678 A | 10/2018 |

OTHER PUBLICATIONS

International Search Report of PCT/CN2019/073685, dated Apr. 28, 2019, 18 pages.
Office Action of CN Application No. 201810461227.4, dated Mar. 16, 2020, 8 pages.

* cited by examiner

OVERVOLTAGE PROTECTION UNIT, OVERVOLTAGE PROTECTION METHOD, SAMPLING MODULE, PIXEL CIRCUIT AND DISPLAY APPARATUS

CROSS-REFERENCE TO RELATED APPLICATION

This application is the U.S. national phase of PCT Application No. PCT/CN2019/073685 filed on Jan. 29, 2019, which claims a priority to Chinese Patent Application No. 201810461227.4 filed in China on May 15, 2018, the disclosures of which are incorporated in their entirety by reference herein.

TECHNICAL FIELD

This disclosure relates to the field of overvoltage protection, in particular to an overvoltage protection unit, an overvoltage protection method, a sampling module, a pixel circuit and a display apparatus.

BACKGROUND

Current pixel circuit includes a light emitting element, a data writing module, a storage capacitor module, a driver module and a compensation control module. The data writing module is used to connect a data line to a control terminal of the driver module or disconnect the data line from the control terminal of the driver module under the control of a first scan line; a first terminal of the driver module is connected with a power supply voltage terminal, a second terminal of the driver module is connected with the light emitting element; a first terminal of the storage capacitor module is connected with the control terminal of the driver module, a second terminal of the storage capacitor module is connected with the second terminal of the driver module; a control terminal of the compensation control module is connected with a second scan line, a first terminal of the compensation control module is connected with the second terminal of the driver module, a second terminal of the compensation control module is connected with a sense line, and the compensation control module is used to connect the second terminal of the driver module to the sense line or disconnect the second terminal of the driver module from the sense line under the control of the second scan line. During the production process of display panel or the process of switching on the display panel, a shorting in the circuit may occur, which may give rise to a sense line voltage exceeding a maximum operating voltage of an Analog-to-Digital Converter (ADC), causing irrevocable serious damage to the Analog-to-Digital Converter and leading to a malfunctioning display panel.

SUMMARY

This disclosure provides an overvoltage protection unit, including a comparator and an output switch, where a first input terminal of the comparator is supplied with a predetermined maximum voltage, a second input terminal of the comparator is supplied with an actual sampled voltage, an output terminal of the comparator is connected with a control terminal of the output switch and the actual sampled voltage is supplied to an input terminal of the output switch; the output switch selectively outputs the actual sampled voltage in accordance with an output signal of the comparator.

In some embodiments, in the case that the predetermined maximum voltage is greater than or equal to the actual sampled voltage, the comparator outputs a first voltage signal such that the output switch is turned on to output the actual sampled voltage; and in the case that the predetermined maximum voltage is less than the actual sampled voltage, the comparator outputs a second voltage signal such that the output switch is turned off.

In some embodiments, the output switch includes an inverter and a transmission gate; an input terminal of the inverter is connected with the output terminal of the comparator, and an output terminal of the inverter is connected with a first control terminal of the transmission gate; the inverter is configured to invert a voltage signal input via the input terminal of the inverter, and output an inverted voltage signal via the output terminal of the inverter; a second control terminal of the transmission gate is connected with the output terminal of the comparator, and an input terminal of the transmission gate is supplied with the actual sampled voltage; and the transmission gate is configured to output the actual sampled voltage via an output terminal of the transmission gate when the comparator outputs the first voltage signal via the output terminal of the comparator, and the transmission gate is configured not to output the actual sampled voltage when the comparator outputs the second voltage signal via the output terminal of the comparator.

In some embodiments, the first input terminal is a non-inverting input terminal, the second input terminal is an inverting input terminal, the first voltage signal is a high voltage signal, the second voltage signal is a low voltage signal, the first control terminal is an inverting control terminal, and the second control terminal is a non-inverting control terminal.

In some embodiments, the first input terminal is an inverting input terminal, the second input terminal is a non-inverting input terminal, the first voltage signal is a low voltage signal, the second voltage signal is a high voltage signal, the first control terminal is a non-inverting control terminal, and the second control terminal is an inverting control terminal.

In some embodiments, the output switch includes an output control transistor; a gate electrode of the output control transistor is connected with the output terminal of the comparator, and a first electrode of the output control transistor is supplied with the actual sampled voltage; and the output control transistor is configured to be turned on when the comparator outputs the first voltage signal via the output terminal of the comparator, so as to output the actual sampled voltage via a second electrode of the output control transistor, and the output control transistor is configured to be turned off when the comparator outputs the second voltage signal via the output terminal of the comparator, so as not to output the actual sampled voltage.

In some embodiments, the first input terminal is a non-inverting input terminal, the second input terminal is an inverting input terminal, the first voltage signal is a high voltage signal, the second voltage signal is a low voltage signal, and the output control transistor is a N-type transistor.

In some embodiments, the first input terminal is an inverting input terminal, the second input terminal is a non-inverting input terminal, the first voltage signal is a low voltage signal, the second voltage signal is a high voltage signal, and the output control transistor is a P-type transistor.

This disclosure further provides an overvoltage protection method, applied to the overvoltage protection unit described above, and including: a comparator comparing a predetermined maximum voltage and an actual sampled voltage, outputting a first voltage signal to the output switch when it is determined that the predetermined maximum voltage is greater than the actual sampled voltage, and outputting a second voltage signal to the output switch when it is determined that the predetermined maximum voltage is less than the actual sampled voltage; and the output switch outputting the actual sampled voltage when the first voltage signal is received by the output switch and not outputting the actual sampled voltage when the second voltage signal is received by the output switch.

This disclosure further provides a sampling module, including a sense line and an overvoltage protection unit described above, where the overvoltage protection unit includes a comparator and an output switch; the sense line is connected with both the comparator and the output switch and is configured to supply the actual sampled voltage to the comparator and the output switch.

In some embodiments, the sampling module described in this disclosure further includes a processing sub-circuit; the processing sub-circuit is connected with the output switch, is configured to receive the actual sampled voltage when a first voltage signal is received by the output switch and is configured to process the actual sampled voltage; and a predetermined maximum voltage supplied to the comparator is a maximum operating voltage of the processing sub-circuit.

In some embodiments, the processing sub-circuit includes an Analog-to-Digital Converter, the Analog-to-Digital Converter is configured to receive the actual sampled voltage when the first voltage signal is received by the output switch and is configured to perform an analog-to-digital conversion on the actual sampled voltage.

This disclosure further provides a pixel circuit, including a pixel driver sub-circuit and a sampling module described above, where the pixel driver sub-circuit is connected with a sense line included by the sampling module.

In some embodiments, the pixel circuit described in this disclosure further includes a light emitting element, the pixel driver sub-circuit includes a data writing module, a storage capacitor module, a driver module and a compensation control module; a control terminal of the data writing module is connected with a first scan line, a first terminal of the data writing module is connected with a data line, a second terminal of the data writing module is connected with a control terminal of the driver module, the data writing module is configured to connect the data line to the control terminal of the driver module or disconnect the data line from the control terminal of the driver module under the control of the first scan line; a first terminal of the driver module is connected with a power supply voltage terminal, a second terminal of the driver module is connected with the light emitting element; the driver module is configured to connect the power supply voltage terminal to the light emitting element or disconnect the power supply voltage terminal from the light emitting element under the control of the control terminal of the driver module; a first terminal of the storage capacitor module is connected with the control terminal of the driver module, a second terminal of the storage capacitor module is connected with the second terminal of the driver module; a control terminal of the compensation control module is connected with a second scan line, a first terminal of the compensation control module is connected with the second terminal of the driver module, a second terminal of the compensation control module is connected with the sense line, and the compensation control module is configured to connect the second terminal of the driver module to the sense line or disconnect the second terminal of the driver module from the sense line under the control of the second scan line.

This disclosure further provides a display apparatus, including a pixel circuit described above.

DETAILED DESCRIPTION

The following describes clearly and completely the technical solutions according to the embodiments of this disclosure with reference to the accompanying drawings in the embodiments of this disclosure. It is apparent the embodiments in the following description are merely a part rather than all of the embodiments of this disclosure. All other embodiments obtained by a person of ordinary skill in the art based on the embodiments of this disclosure without creative efforts shall fall within the scope of this disclosure.

Any transistor employed in all embodiments of this disclosure may be a Thin Film Transistor (TFT), a Field Effect Transistor (FET) or other device with the same characteristics. In embodiments of this disclosure, in order to distinguish between two electrodes, besides the gate electrode, of a transistor, one of the two electrodes of the transistor is designated as a first electrode and the other is designated as a second electrode. In practice, the first electrode may be a drain electrode and the second electrode may be a source electrode, or the first electrode may be a source electrode and the second electrode may be a drain electrode.

In addition, terms "output switch" in this disclosure are used to represent a three-terminal switch device, which is capable of toggling between an on state and an off state in response to a control signal input via a control terminal. The output switch often includes an input terminal, an output terminal and a control terminal, and is configured to selectively output, via the output terminal, a signal input via the input terminal.

An object of this disclosure is to provide an overvoltage protection unit, an overvoltage protection method, a sampling module, a pixel circuit and a display apparatus, so as to solve the problem in related art that a sense line voltage exceeds a maximum operating voltage of an ADC which causing irrevocable serious damage to the Analog-to-Digital Converter and leading to a malfunctioning display panel.

Figure 1:
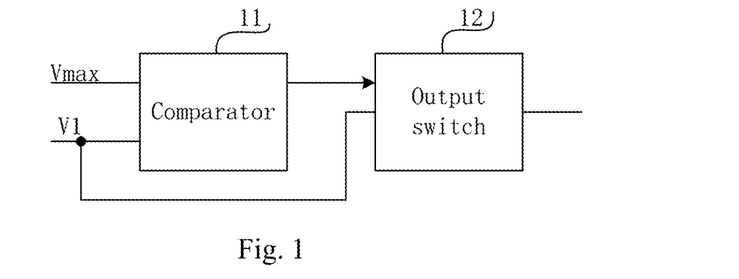
FIG. 1 is a structural diagram of an overvoltage protection unit described in embodiments of this disclosure.

As shown in FIG. 1, the overvoltage protection unit described in embodiments of this disclosure includes a comparator 11 and an output switch 12, where a first input terminal of the comparator 11 is supplied with a predetermined maximum voltage V max, a second input terminal of the comparator 11 is supplied with an actual sampled voltage V1, an output terminal of the comparator is connected with a control terminal of the output switch 12 and the actual sampled voltage V1 is supplied to an input terminal of the output switch 12; the output switch 12 selectively outputs the actual sampled voltage V1 in accordance with an output signal of the comparator 11. The comparator 11 is configured to compare the predetermined maximum voltage V max with the actual sampled voltage V1, output a first voltage signal to the output switch 12 when it is determined that the predetermined maximum voltage V max is greater than the actual sampled voltage V1, and output a second voltage signal to the output switch 12 when it is determined that the predetermined maximum voltage V max is less than the actual sampled voltage V1.

The output switch 12 is connected with the comparator 11, and is supplied with the actual sampled voltage V1. The output switch 12 is configured to be turned on so as to output the actual sampled voltage V1 when the first voltage signal is received by the output switch 12, and is configured to be turned off so as not to output the actual sampled voltage V1 when the second voltage signal is received by the output switch 12.

The overvoltage protection unit described in embodiments of this disclosure includes the comparator 11 and the output switch 12. The comparator 11 compares the actual sampled voltage V1 and the predetermined maximum voltage V max, and controls the output switch 12 to output the actual sampled voltage V1 when the actual sampled voltage V1 is less than the predetermined maximum voltage V max, such that an occurrence of overvoltage breakdown may be prevented.

In practice, the actual sampled voltage V1 may be a voltage on a sense line of a sub-pixel circuit unit, and the output terminal of the output switch 12 may be connected with the Analog-to-Digital Converter. In embodiments of this disclosure, an impact of excessive sense line voltage upon the Analog-to-Digital Converter is prevented by providing the comparator 11 and the output switch 12 between the sense line and the Analog-to-Digital Converter, so that the analog voltage signal on the sense line may be converted by the Analog-to-Digital Converter into digital voltage signal in a safe and stable manner.

In some embodiments, the first input terminal of the comparator is supplied with the predetermined maximum voltage, the second input terminal of the comparator is supplied with the actual sampled voltage, the output terminal of the comparator is connected with the control terminal of the output switch and the actual sampled voltage is supplied to the input terminal of the output switch; the output switch selectively outputs the actual sampled voltage in accordance with the output signal of the comparator.

In some embodiments, in the case that the predetermined maximum voltage is greater than or equal to the actual sampled voltage, the comparator outputs the first voltage signal such that the output switch is turned on to output the actual sampled voltage; in the case that the predetermined maximum voltage is less than the actual sampled voltage, the comparator outputs the second voltage signal such that the output switch is turned off.

According to a specific implementation, the first input terminal may be a non-inverting input terminal, and the second input terminal may be an inverting input terminal. In the case that the predetermined maximum voltage is greater than the actual sampled voltage, the comparator outputs the first voltage signal which is a high voltage signal; and in the case that the predetermined maximum voltage is less than the actual sampled voltage, the comparator outputs the second voltage signal which is a low voltage signal.

According to another implementation, the first input terminal may be an inverting input terminal, and the second input terminal may be a non-inverting input terminal. In the case that the predetermined maximum voltage is greater than the actual sampled voltage, the comparator outputs the first voltage signal which is a low voltage signal; and in the case that the predetermined maximum voltage is less than the actual sampled voltage, the comparator outputs the second voltage signal which is a high voltage signal.

Specifically, the output switch may include an inverter and a transmission gate; an input terminal of the inverter is connected with the output terminal of the comparator, and an output terminal of the inverter is connected with a first control terminal of the transmission gate; the inverter is configured to invert a voltage signal input via the input terminal of the inverter, and output an inverted voltage signal via the output terminal of the inverter; a second control terminal of the transmission gate is connected with the output terminal of the comparator, and an input terminal of the transmission gate is supplied with the actual sampled voltage; and the transmission gate is configured to output the actual sampled voltage via an output terminal of the transmission gate when the comparator outputs the first voltage signal via the output terminal of the comparator, and the transmission gate is configured not to output the actual sampled voltage when the comparator outputs the second voltage signal via the output terminal of the comparator.

In some embodiments, when the first input terminal is a non-inverting input terminal, the second input terminal is an inverting input terminal, the first voltage signal is a high voltage signal and the second voltage signal is a low voltage signal, the first control terminal is an inverting control terminal, and the second control terminal is a non-inverting control terminal; when the first input terminal is an inverting input terminal, the second input terminal is a non-inverting input terminal, the first voltage signal is a low voltage signal and the second voltage signal is a high voltage signal, the first control terminal is a non-inverting control terminal, and the second control terminal is an inverting control terminal; when the non-inverting control terminal of the transmission gate is supplied with the high voltage signal and the inverting control terminal of the transmission gate is supplied with the low voltage signal, the transmission gate outputs the actual sampled voltage.

In practice, when the predetermined maximum voltage supplied to the first input terminal of the comparator is equal to the actual sampled voltage supplied to the second input terminal of the comparator, the comparator outputs a high level signal.

Term "transmission gate" used in this disclosure encompasses Complementary Metal-Oxide-Semiconductor (CMOS) Transmission Gate (TG) which includes a P-Metal-Oxide-Semiconductor (PMOS) transistor and an N-Metal-Oxide-Semiconductor (NMOS) transistor connected in parallel. In some embodiments, a control terminal of the NMOS transistor may be called non-inverting control terminal and a control terminal of the PMOS transistor may be called inverting control terminal. In embodiments of this disclosure, by providing an inverter at the inverting control terminal, a control signal may be supplied to the control terminals of the PMOS and NMOS transistors simultaneously, and the CMOS transmission gate is controlled to turn on only in response to a desired control signal; therefore, as a whole, the CMOS transmission gate is constructed as a three-terminal device.

Figure 2:
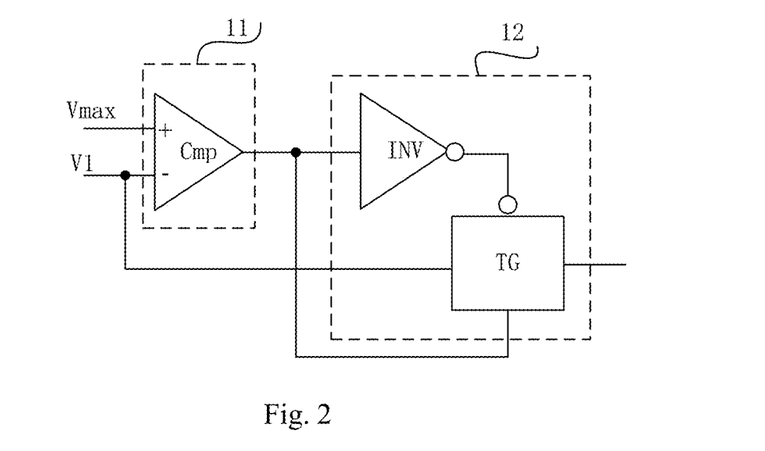
FIG. 2 is a circuit diagram of an overvoltage protection unit described in some embodiments of this disclosure.

As shown in FIG. 2, in some embodiments, the overvoltage protection unit described in this disclosure includes the comparator 11 and the output switch 12. Specifically, the comparator 11 includes a comparator CMP; the output switch 12 includes an inverter INV and a transmission gate TG; a non-inverting input terminal of the comparator CMP is supplied with the predetermined maximum voltage V max, an inverting input terminal of the comparator CMP is supplied with the actual sampled voltage V1, an output terminal of the comparator CMP is connected with an input terminal of the inverter INV; an output terminal of the inverter INV is connected with an inverting control terminal of the transmission gate TG; the inverter INV is configured to invert a voltage signal input via the input terminal of the inverter INV, and output an inverted voltage signal via the output terminal of the inverter INV; a non-inverting control terminal of the transmission gate TG is connected with the output terminal of the comparator CMP, and an input terminal of the transmission gate TG is supplied with the actual sampled voltage V1; and the transmission gate TG is configured to output the actual sampled voltage V1 via an output terminal of the transmission gate TG when the comparator CMP outputs the high voltage signal via the output terminal of the comparator CMP, and the transmission gate TG is configured to be turned off and not to output the actual sampled voltage V1 when the comparator CMP outputs the low voltage signal via the output terminal of the comparator CMP, thereby a voltage impact onto the Analog-to-Digital Converter can be prevented.

With the overvoltage protection unit according to this disclosure as shown in FIG. 2, the overvoltage protection is achieved; meanwhile, there is no threshold-voltage loss from V1 input via the input terminal of the TG to a voltage output from the output terminal of the TG.

When the overvoltage protection unit according to this disclosure as shown in FIG. 2 is in operation, if V max is greater than or equal to V1, the CMP outputs the high voltage signal, the INV outputs the low voltage signal; the non-inverting control terminal of the TG is supplied with the high voltage signal, the inverting control terminal of the TG is supplied with the low voltage signal and the TG outputs V1; if V max is less than V1, the CMP outputs the low voltage signal, the INV outputs the high voltage signal; the non-inverting control terminal of the TG is supplied with the low voltage signal, the inverting control terminal of the TG is supplied with the high voltage signal and the TG does not output a voltage.

Specifically, the output switch may include an output control transistor; a gate electrode of the output control transistor is connected with the output terminal of the comparator, and a first electrode of the output control transistor is supplied with the actual sampled voltage; and the output control transistor is configured to be turned on when the comparator outputs the first voltage signal via the output terminal of the comparator, so as to output the actual sampled voltage via a second electrode of the output control transistor, and the output control transistor is configured to be turned off when the comparator outputs the second voltage signal via the output terminal of the comparator, so as not to output the actual sampled voltage.

According to some embodiments of the present disclosure, the first input terminal is a non-inverting input terminal, the second input terminal is an inverting input terminal, the first voltage signal is a high voltage signal, the second voltage signal is a low voltage signal, and the output control transistor is a N-type transistor.

In practice, when the predetermined maximum voltage supplied to the first input terminal of the comparator is equal to the actual sampled voltage supplied to the second input terminal of the comparator, the comparator outputs a high level signal.

According to another embodiment, the first input terminal is an inverting input terminal, the second input terminal is a non-inverting input terminal, the first voltage signal is a low voltage signal, the second voltage signal is a high voltage signal, and the output control transistor is a P-type transistor.

Figure 3:
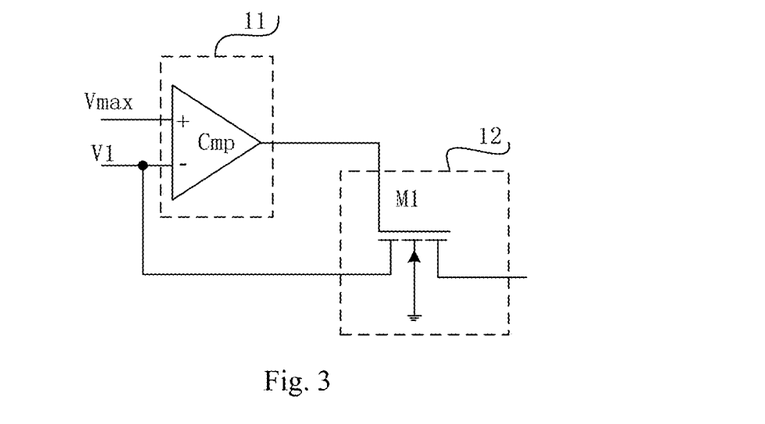
FIG. 3 is another circuit diagram of an overvoltage protection unit described in some embodiments of this disclosure.

As shown in FIG. 3, in some embodiments, the overvoltage protection unit described in this disclosure includes the comparator 11 and the output switch 12; the comparator 11 includes a comparator CMP; the output switch 12 includes an output control transistor M1; the M1 is an NMOS transistor; a non-inverting input terminal of the comparator CMP is supplied with the predetermined maximum voltage V max, an inverting input terminal of the comparator CMP is supplied with the actual sampled voltage V1, and an output terminal of the comparator CMP is connected with a gate electrode of the output control transistor M1; when V max is greater than or equal to V1, the CMP outputs the high voltage signal; when V max is less than V1, the CMP outputs the low voltage signal; a drain electrode of the output control transistor M1 is supplied with the actual sampled voltage V1; the output control transistor M1 is turned on when the comparator CMP outputs the high voltage signal via the output terminal of the comparator CMP, so as to output the actual sampled voltage V1 via a source electrode of the output control transistor M1, and the output control transistor M1 is turned off when the comparator CMP outputs the low voltage signal via the output terminal of the comparator CMP, so as not to output the actual sampled voltage V1.

Figure 4:
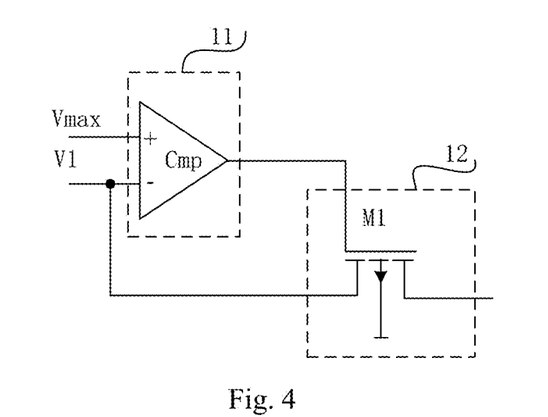
FIG. 4 is yet another circuit diagram of an overvoltage protection unit described in some embodiments of this disclosure.

As shown in FIG. 4, in some embodiments, the overvoltage protection unit described in this disclosure includes the comparator 11 and the output switch 12; the comparator 11 includes a comparator CMP; the output switch 12 includes an output control transistor M1; the M1 is a PMOS transistor; an inverting input terminal of the comparator CMP is supplied with the predetermined maximum voltage V max, a non-inverting input terminal of the comparator CMP is supplied with the actual sampled voltage V1, and an output terminal of the comparator CMP is connected with a gate electrode of the output control transistor M1; when V1 is greater than or equal to V max, the CMP outputs the high voltage signal; when V1 is less than V max, the CMP outputs the low voltage signal; a source electrode of the output control transistor M1 is supplied with the actual sampled voltage V1; the output control transistor M1 is turned on when the comparator CMP outputs the low voltage signal via the output terminal of the comparator CMP, so as to output the actual sampled voltage V1 via a drain electrode of the output control transistor M1, and the output control transistor M1 is turned off when the comparator CMP outputs the high voltage signal via the output terminal of the comparator CMP, so as not to output the actual sampled voltage V1.

With the overvoltage protection unit described in embodiments of this disclosure, the sense line may be isolated from the Analog-to-Digital Converter when V max is less than V1, in order to protect the Analog-to-Digital Converter.

In the overvoltage protection unit described in this disclosure, the comparator compares the actual sampled voltage and the predetermined maximum voltage, and controls the output switch to output the actual sampled voltage only when the actual sampled voltage is less than the predetermined maximum voltage, such that an occurrence of overvoltage breakdown may be prevented.

Figure 5:
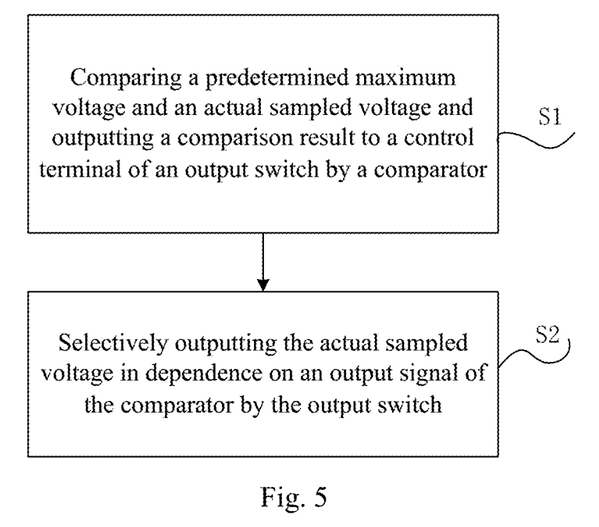
FIG. 5 is a flow diagram of an overvoltage protection method described in embodiments of this disclosure.

An overvoltage protection method described in embodiments of this disclosure is applicable to the aforementioned overvoltage protection unit. As shown in FIG. 5, the overvoltage protection method includes: S1: comparing a predetermined maximum voltage and an actual sampled voltage and outputting a comparison result to a control terminal of an output switch by a comparator; and S2: selectively outputting the actual sampled voltage in accordance with an output signal of the comparator by the output switch.

The overvoltage protection method described in the embodiments of this disclosure compares the actual sampled voltage and the predetermined maximum voltage by the comparator, and controls the output switch to output the actual sampled voltage only when the actual sampled voltage is less than the predetermined maximum voltage, such that an occurrence of overvoltage breakdown may be prevented.

Figure 6:
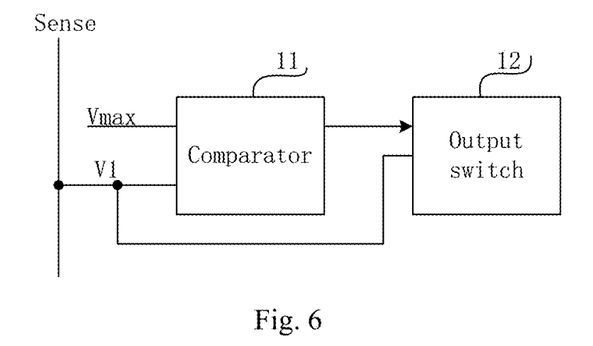
FIG. 6 is a structural diagram of a sampling module described in embodiments of this disclosure.

As shown in FIG. 6, the sampling module described in the embodiments of this disclosure includes a sense line Sense as well as the overvoltage protection unit described above; the overvoltage protection unit includes the comparator 11 and the output switch 12; the sense line Sense is connected with both the comparator 11 and the output switch 12 and is configured to supply the actual sampled voltage V1 to the comparator 11 and the output switch 12.

In practice, the sampling module described in the embodiments of this disclosure includes the sense line Sense and the actual sampled voltage V1 comes from the sense line Sense.

Specifically, the sampling module described in the embodiments of this disclosure may further include a processing sub-circuit; the processing sub-circuit is connected with the output switch, is configured to receive the actual sampled voltage when a first voltage signal is received by the output switch and process the actual sampled voltage; and a predetermined maximum voltage supplied to the comparator is a maximum operating voltage of the processing sub-circuit.

In practice, the processing sub-circuit may include e.g. an ADC to perform an analog-to-digital conversion on the actual sampled voltage, but the disclosure is not limited thereto.

In some embodiments, the processing sub-circuit includes an ADC, the ADC is configured to receive the actual sampled voltage when the first voltage signal is received by the output switch and perform an analog-to-digital conversion on the actual sampled voltage.

A pixel circuit described in the embodiments of this disclosure includes a pixel driver sub-circuit and a sampling module described above, where the pixel driver sub-circuit is connected with a sense line included by the sampling module.

Figure 7:
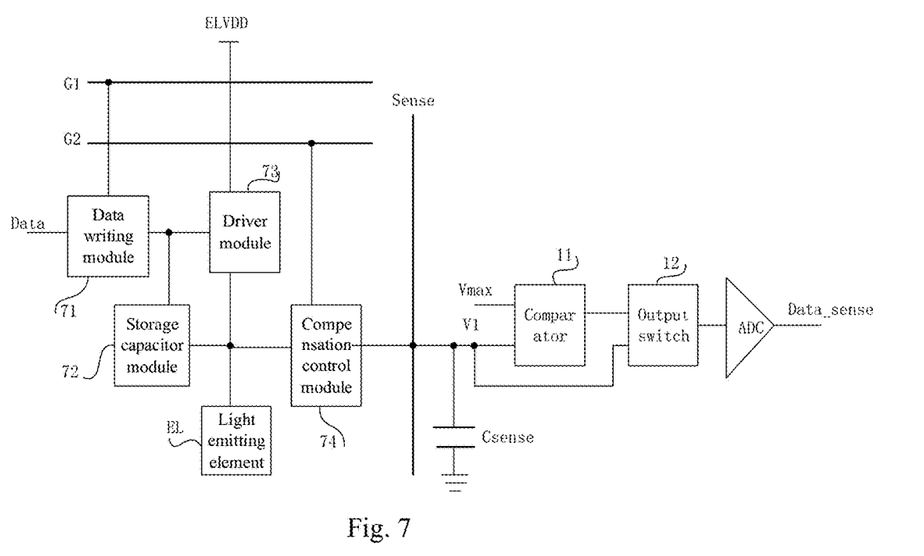
FIG. 7 is a structural diagram of a pixel circuit described in embodiments of this disclosure.

As shown in FIG. 7, the pixel circuit described in the embodiments of this disclosure includes the sampling module and a light emitting element EL, the pixel driver sub-circuit includes a data writing module 71, a storage capacitor module 72, a driver module 73 and a compensation control module 74; a control terminal of the data writing module 71 is connected with a first scan line G1, a first terminal of the data writing module 71 is connected with a data line Data, a second terminal of the data writing module 71 is connected with a control terminal of the driver module 73, the data writing module 71 is configured to connect the data line Data to the control terminal of the driver module 73 or disconnect the data line Data from the control terminal of the driver module 73 under the control of the first scan line G1; a first terminal of the driver module 73 is connected with a power supply voltage terminal ELVDD, a second terminal of the driver module 73 is connected with the light emitting element EL; the driver module 73 is configured to connect the power supply voltage terminal ELVDD to the light emitting element EL or disconnect the power supply voltage terminal ELVDD from the light emitting element EL under the control of the control terminal of the driver module 73; a first terminal of the storage capacitor module 72 is connected with the control terminal of the driver module 73, a second terminal of the storage capacitor module 72 is connected with the second terminal of the driver module 73; a control terminal of the compensation control module 74 is connected with a second scan line G2, a first terminal of the compensation control module 74 is connected with the second terminal of the driver module 73, a second terminal of the compensation control module 74 is connected with the sense line Sense, and the compensation control module 74 is configured to connect the second terminal of the driver module 73 to the sense line Sense or disconnect the second terminal of the driver module 73 from the sense line Sense under the control of the second scan line G2; the sampling module includes the overvoltage protection unit and the Analog-to-Digital Converter ADC; the overvoltage protection unit includes the comparator 11 and the output switch 12; the sense line Sense is connected with the comparator 11 and is configured to provide the actual sampled voltage V1 to the comparator 11; the Analog-to-Digital Converter ADC is connected with the output switch 12; the Analog-to-Digital Converter ADC outputs a digital voltage signal Data_sense.

In FIG. 7, V max denotes the predetermined maximum voltage, and a capacitor on the sense line Sense is labeled as Csense.

When the pixel circuit embodiment of this disclosure as shown in FIG. 7 is in operation, in a compensation phase, the compensation control module 74, under the control of G2, controls a connection between the second terminal of the driver module 73 and the sense line Sense.

Figure 8:
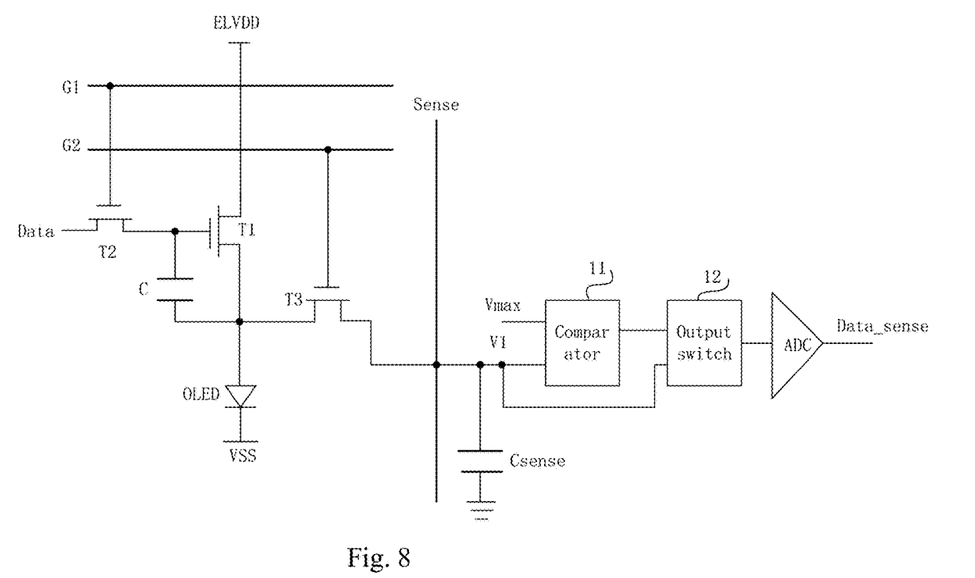
FIG. 8 is a circuit diagram of a pixel circuit described in some embodiments of this disclosure.

In some pixel circuit embodiments as shown in FIG. 8 and described in this disclosure which are based on the pixel circuit embodiment as shown in FIG. 7, the data writing module includes a data writing transistor T2; the storage capacitor module includes a storage capacitor C; the driver module includes a driver transistor T1 and the compensation control module includes a compensation control transistor T3; the light emitting element is an organic light-emitting diode OLED; a gate electrode of the T2 is connected with the G1, a drain electrode of the T2 is connected with the data line Data and a source electrode of the T2 is connected with a gate electrode of the T1; a drain electrode of the T1 is connected with the ELVDD, a source electrode of the T1 is connected with an anode of the OLED and a cathode of the OLED is supplied with a low electric level VSS; a first terminal of the storage capacitor C is connected with the gate electrode of the T1 and a second terminal of the storage capacitor C is connected with the anode of the OLED; a gate electrode of the T3 is connected with the G2, a drain electrode of the T3 is connected with the anode of the OLED and a source electrode of the T3 is connected with the sense line Sense.

In the pixel circuit as shown in FIG. 8, each of the T1, T2 and T3 is an N-type transistor, but the disclosure is not limited thereto.

When the pixel circuit described in this disclosure is in operation, a operating mode and operating current of the T1 are controlled through the G1 and the Data, whereby the magnitude of the current running through the OLED is regulated, thus achieving an illuminance control of the OLED and a more colorful display panel. Moreover, in order to achieve better compensation effect, it is necessary to read a voltage from the source electrode of the T1, where the voltage reading may be achieved by controlling the gating of the T3 by means of the G2; the voltage read after the gating is stored temporarily in the capacitor Csense on the sense line Sense, and following a conversion from the read analog voltage signal to the digital voltage signal by the Analog-to-Digital Converter, is transferred to a computer for processing.

The display apparatus described in the embodiments of this disclosure includes the pixel circuit describe above.

The display apparatus may be any product or component with a display function, such as an electronic paper, Organic Light-Emitting Diode (OLED) display apparatus, handset, tablet computer, television set, display, laptop computer, digital photo frame or navigator.

The above descriptions merely describe some embodiments of this disclosure. It should be appreciated that modifications and replacements may be made in the embodiments by a person skilled in the art without departing from the principle of this disclosure, and these modifications and replacements shall fall within the scope of this disclosure.

What is claimed is:

1. A pixel circuit, comprising a pixel driver sub-circuit and a sampling module, wherein the sampling module comprises a sense line and an overvoltage protection unit, the overvoltage protection unit comprises a comparator and an output switch, the sense line is connected with both the comparator and the output switch and is configured to supply the actual sampled voltage to the comparator and the output switch;

wherein the pixel driver sub-circuit is connected with a sense line in the sampling module;

wherein a first input terminal of the comparator is supplied with a predetermined maximum voltage, a second input terminal of the comparator is supplied with an actual sampled voltage, an output terminal of the comparator is connected with a control terminal of the output switch and the actual sampled voltage is supplied to an input terminal of the output switch;

the output switch selectively outputs the actual sampled voltage in accordance with an output signal of the comparator;

wherein the output switch comprises an inverter and a transmission gate;

an input terminal of the inverter is connected with the output terminal of the comparator, and an output terminal of the inverter is connected with a first control terminal of the transmission gate;

a second control terminal of the transmission gate is connected with the output terminal of the comparator, and an input terminal of the transmission gate is supplied with the actual sampled voltage;

the transmission gate outputs the actual sampled voltage when the comparator outputs the first voltage signal, and the transmission gate is turned off when the comparator outputs the second voltage signal; and the output switch selectively outputs the actual sampled voltage in accordance with an output signal of the comparator.

2. The pixel circuit according to claim 1, wherein in the case that the predetermined maximum voltage is greater than or equal to the actual sampled voltage, the comparator outputs a first voltage signal such that the output switch is turned on to output the actual sampled voltage; and in the case that the predetermined maximum voltage is less than the actual sampled voltage, the comparator outputs a second voltage signal such that the output switch is turned off.

3. The pixel circuit according to claim 1, wherein the first input terminal is a non-inverting input terminal, the second input terminal is an inverting input terminal, the first voltage signal is a high voltage signal, the second voltage signal is a low voltage signal, the first control terminal is an inverting control terminal, and the second control terminal is a non-inverting control terminal.

4. The pixel circuit according to claim 3, wherein the first input terminal is an inverting input terminal, the second input terminal is a non-inverting input terminal, the first voltage signal is a low voltage signal, the second voltage signal is a high voltage signal, the first control terminal is a non-inverting control terminal, and the second control terminal is an inverting control terminal.

5. The pixel circuit according to claim 1, wherein the output switch comprises an output control transistor;

a gate electrode of the output control transistor is connected with the output terminal of the comparator, and a first electrode of the output control transistor is supplied with the actual sampled voltage; and the output control transistor is turned on when the comparator outputs the first voltage signal, and is turned off when the comparator outputs the second voltage signal.

6. The pixel circuit according to claim 5, wherein the first input terminal is a non-inverting input terminal, the second input terminal is an inverting input terminal, the first voltage signal is a high voltage signal, the second voltage signal is a low voltage signal, and the output control transistor is a N-type transistor.

7. The pixel circuit according to claim 5, wherein the first input terminal is an inverting input terminal, the second input terminal is a non-inverting input terminal, the first voltage signal is a low voltage signal, the second voltage signal is a high voltage signal, and the output control transistor is a P-type transistor.

8. An overvoltage protection method, applied to the pixel circuit according to claim 1, the method comprising:

comparing a predetermined maximum voltage and an actual sampled voltage and outputting a comparison result to a control terminal of an output switch by a comparator; and outputting, by the output switch, the actual sampled voltage selectively in accordance with an output signal of the comparator.

9. The pixel circuit according to claim 1, wherein the sampling module further comprises a processing sub-circuit;

the processing sub-circuit is connected with the output switch, is configured to receive the actual sampled voltage when a first voltage signal is received by the output switch and is configured to process the actual sampled voltage; and the predetermined maximum voltage supplied to the comparator is a maximum operating voltage of the processing sub-circuit.

10. The pixel circuit according to claim 9, wherein the processing sub-circuit comprises an Analog-to-Digital Converter configured to receive the actual sampled voltage when the first voltage signal is received by the output switch and perform an analog-to-digital conversion on the actual sampled voltage.

11. The pixel circuit according to claim 1, further comprising a light emitting element, the pixel driver sub-circuit comprises a data writing module, a storage capacitor module, a driver module and a compensation control module;

a control terminal of the data writing module is connected with a first scan line, a first terminal of the data writing module is connected with a data line, a second terminal of the data writing module is connected with a control terminal of the driver module, the data writing module is configured to connect the data line to the control terminal of the driver module or disconnect the data line from the control terminal of the driver module under the control of the first scan line;

a first terminal of the driver module is connected with a power supply voltage terminal, a second terminal of the driver module is connected with the light emitting element; the driver module is configured to connect the power supply voltage terminal to the light emitting element or disconnect the power supply voltage terminal from the light emitting element under the control of the control terminal of the driver module;

a first terminal of the storage capacitor module is connected with the control terminal of the driver module, a second terminal of the storage capacitor module is connected with the second terminal of the driver module;

a control terminal of the compensation control module is connected with a second scan line, a first terminal of the compensation control module is connected with the second terminal of the driver module, a second terminal of the compensation control module is connected with the sense line, and the compensation control module is configured to connect the second terminal of the driver module to the sense line or disconnect the second terminal of the driver module from the sense line under the control of the second scan line.

12. A display apparatus, comprising a pixel circuit according to claim 11.

* * * * *